United States Patent
Kunstadt et al.

(10) Patent No.: US 6,840,982 B2
(45) Date of Patent: Jan. 11, 2005

(54) STORAGE DEVICE UTILIZING A DIFFERENTIALLY PERMEABLE MEMBRANE TO CONTROL GASEOUS CONTENT

(75) Inventors: Lawrence Kunstadt, Ardsley, NY (US); Peter Carlson, Chevy Chase, MD (US)

(73) Assignee: American Moxie, LLC, Ardsley, NY (US)

( * ) Notice: Subject to any disclaimer, the term of this patent is extended or adjusted under 35 U.S.C. 154(b) by 34 days.

(21) Appl. No.: 10/291,444

(22) Filed: Nov. 8, 2002

(65) Prior Publication Data

US 2003/0061938 A1 Apr. 3, 2003

Related U.S. Application Data

(63) Continuation-in-part of application No. 10/093,678, filed on Mar. 8, 2002.
(60) Provisional application No. 60/275,397, filed on Mar. 13, 2001.

(51) Int. Cl.[7] .......................... A23B 7/148; B01D 53/22
(52) U.S. Cl. ..................... 95/47; 96/4; 96/134; 96/148; 96/421; 55/385.4; 55/315.1; 55/467.1; 62/78; 62/440
(58) Field of Search ................................ 96/4, 10, 134, 96/148, 397, 421; 55/315.1, 385.4, 467.1; 95/45, 47; 62/78, 440, 458; 426/418

(56) References Cited

U.S. PATENT DOCUMENTS

| | | | |
|---|---|---|---|
| 3,683,638 A | | 8/1972 | Devon |
| 4,817,391 A | * | 4/1989 | Roe et al. ...................... 62/624 |
| 4,845,958 A | | 7/1989 | Senda et al. |
| 5,102,432 A | | 4/1992 | Prasad |
| 5,249,428 A | | 10/1993 | Barbe et al. |
| 5,308,382 A | | 5/1994 | Prasad |
| 5,355,781 A | * | 10/1994 | Liston et al. ................... 99/476 |
| 5,505,056 A | * | 4/1996 | Jones .............................. 62/78 |
| 5,515,693 A | * | 5/1996 | Cahill-O'Brien et al. ...... 62/179 |
| 5,649,995 A | | 7/1997 | Gast, Jr. |
| 6,092,430 A | * | 7/2000 | Liston et al. ............. 73/863.81 |
| 6,427,484 B1 | * | 8/2002 | Choi et al. ..................... 62/640 |
| 6,446,459 B1 | * | 9/2002 | Sawhney et al. .............. 62/440 |
| 6,615,908 B1 | * | 9/2003 | Bosher et al. .............. 165/48.1 |

FOREIGN PATENT DOCUMENTS

| JP | 7-59511 A | * | 3/1995 |
|---|---|---|---|
| JP | 07059511 | | 3/1995 |

* cited by examiner

Primary Examiner—Frank M. Lawrence
(74) Attorney, Agent, or Firm—St. Onge Steward Johnston & Reens LLC (57) ABSTRACT

A storage device for the preservation of oxidizable materials is provided. The storage device includes a storage chamber enclosing a storage space where oxidizable materials may be placed and a differentially permeable membrane. The differentially permeable membrane allows at least one selected gas to pass therethrough while inhibiting at least oxygen from passing therethrough. The differentially permeable membrane is in fluid communication with the storage chamber such that the at least one selected gas is allowed to pass through the differentially permeable membrane flows into the storage chamber. An air mover, preferably a compressor, feeds gases to the differentially permeable membrane. A cooling element is provided for cooling the temperature within the storage chamber below that of the ambient temperature. The level of oxygen within the storage chamber is thus reduced relative to the level of oxygen in the atmosphere.

24 Claims, 8 Drawing Sheets

STORAGE DEVICE UTILIZING A DIFFERENTIALLY PERMEABLE MEMBRANE TO CONTROL GASEOUS CONTENT

CROSS-REFERENCE TO RELATED APPLICATIONS

This application is a continuation-in-part of currently pending U.S. patent application Ser. No. 10/093,678 filed Mar. 8, 2002 which claims the benefit of, under 35 U.S.C. 119(e), U.S. Provisional Patent Application No. 60/275,397, filed Mar. 13, 2001.

FIELD OF THE INVENTION

This invention relates to a storage device, and more specifically to a long-term storage device for oxidizable materials which controls the gaseous content of a storage volume of the device in order to prolong storage life, allow storage of currently difficult-to-store materials and to inhibit the ripening and/or deterioration of certain foods.

BACKGROUND OF THE INVENTION

Refrigerated devices are well known and widely utilized to increase the storage life of items to be stored, such as food items. As an example, a refrigerator commonly used in most households in the United States increases the storage life of many foods by maintaining the temperature well below room temperature, thereby slowing the natural ripening and oxidation processes. However, such devices suffer from a number of disadvantages, including complexity, weight and cost.

Moreover, refrigerated devices can be noisy and generate a great amount of heat, which may be undesirable in many circumstances. Furthermore, refrigeration devices are generally not energy efficient, and thus such devices are typically costly to operate and environmentally unfriendly. Furthermore, refrigeration devices may not be appropriate for storing all food items (e.g., apples may lose their taste when cold, bananas may turn black, etc.). Another problem with refrigeration devices is that they may not be appropriate for storing many non-food items (e.g., documents, stamps, coins, etc.) due to moisture problems.

Another type of storage device which has been developed is a vacuum storage device, which operates by creating a vacuum within a storage volume of the device in order to remove oxygen therefrom, and extend the storage life of oxidizable materials. Although such devices obviate some of the disadvantages of refrigeration devices (i.e., the problems associated with storing certain food items in a cold environment and the moisture problems), vacuum devices do not remedy a number of the other problems. Vacuum storage devices are typically even more complex, heavy and costly to produce than refrigeration devices, which is why such vacuum devices are typically used only in industrial settings. These devices are typically large and may pose a safety problem, as it has been known that persons may become trapped within such devices, and be injured or killed because of the vacuum created therein.

Furthermore, the vacuum pumps used with vacuum storage devices can be noisy and are generally not energy efficient, thereby making vacuum storage devices costly to operate and environmentally unfriendly. Moreover, vacuum storage devices suffer from a number of additional disadvantages. In addition to requiring a costly vacuum pump, the storage volume itself is also costly. This is true because, due to the vacuum created, a structurally heavy storage volume is required so as to inhibit implosion or collapsing thereof due to the vacuum formed therein. Moreover, a complex and expensive sealing means is required so that the storage volume can hold a vacuum. Moreover, despite the precautions taken, there is a very real possibility that implosion may occur and/or that a vacuum may not be held.

Yet another type of storage device which has been developed is an inert gas pumping system. In these devices, an inert gas environment is artificially maintained within a storage volume by pumping an inert gas, such as nitrogen, into the storage volume, thereby displacing the normal atmospheric content (including oxygen) to maintain and prolong the storage life of oxidizable items stored therein. However, these devices are typically even more costly and complex than refrigeration and vacuum systems, and are therefore generally used only to store rare documents, stamps, coins, and/or other valuable materials. A further disadvantage of these types of systems is that it is necessary to provide, and to replace on a regular basis, cylinders of inert gas, which can be costly and burdensome, and which renders such devices appropriate only for large-scale industrial use (as opposed to home use).

What is desired, therefore, is a storage device for oxidizable materials which controls the gaseous content of a storage volume of the device in order to prolong storage life, to allow storage of currently difficult-to-store materials, to allow storage of non-refrigeratable foods and to inhibit the ripening and/or deterioration of certain foods without adversely affecting flavor, which is relatively simple in design, lightweight and inexpensive to produce, which operates quietly and does not generate a great amount of heat, which is appropriate for storing certain oxidizable food items and non-food items, which is energy efficient and therefore relatively inexpensive to operate and environmentally friendly, which does not risk implosion, and which does not require servicing and/or the replacement of components on a regular basis.

SUMMARY OF THE INVENTION

Accordingly, it is an object of the present invention to provide a storage device for oxidizable materials which controls the gaseous content of a storage volume of the device in order to prolong storage life, to allow storage of currently difficult-to-store materials, to allow storage of non-refrigeratable foods and to inhibit the ripening and/or deterioration of certain foods without adversely affecting flavor.

Another object of the present invention is to provide a storage device for oxidizable materials having the above characteristics and which is relatively simple in design, lightweight and inexpensive to produce.

A further object of the present invention is to provide a storage device for oxidizable materials having the above characteristics and which operates quietly and does not generate a great amount of heat.

Still another object of the present invention is to provide a storage device for oxidizable materials having the above characteristics and which is appropriate for storing certain oxidizable food items and non-food items.

Yet a further object of the present invention is to provide a storage device for oxidizable materials having the above characteristics and which is energy efficient and therefore relatively inexpensive to operate and environmentally friendly.

Still yet a further object of the present invention is to provide a storage device for oxidizable materials having the above characteristics and which does not risk implosion.

Yet another object of the present invention is to provide a storage device for oxidizable materials having the above characteristics and which does not require servicing and/or the replacement of components on a regular basis.

These and other objects of the present invention are achieved by provision of a storage device for the preservation of oxidizable materials. The storage device includes a storage chamber enclosing a storage space where oxidizable materials may be placed, the storage chamber having at least one fluid passage therethrough from the storage space to atmosphere. At least one differentially permeable membrane is disposed within at least one of the fluid passages through the storage chamber, the differentially permeable membrane allowing at least one selected gas to pass therethrough while inhibiting at least one other selected gas from passing therethrough. An evacuator evacuates oxygen from within the storage chamber through at least one of the fluid passages to the atmosphere such that the level of oxygen within the storage chamber is reduced relative to the level of oxygen in the atmosphere. A cooling element is also provided which cools the temperature within the storage chamber to a level below the ambient temperature.

In one embodiment, the at least one fluid passage comprises an inlet fluid passage and an outlet fluid passage. The differentially permeable membrane is disposed within the inlet fluid passage and allows at least one gas to pass therethrough while inhibiting at least oxygen from passing therethrough. The evacuator evacuates gases, including oxygen, from within the storage chamber through the outlet fluid passage, and gases other than oxygen replace the gases evacuated by the evacuator by passing through the differentially permeable membrane disposed in the inlet fluid passage until the level of oxygen within the storage chamber is greatly reduced. In this embodiment, a one-way check valve is preferably disposed within the outlet fluid passage to inhibit gases from flowing into the storage chamber through the outlet fluid passage. Most preferably, the differentially permeable membrane allows at least nitrogen to pass therethrough while inhibiting at least oxygen from passing therethrough.

In another embodiment, the at least one fluid passage comprises an outlet fluid passage. The differentially permeable membrane is disposed within the outlet fluid passage and allows at least oxygen to pass therethrough while inhibiting at least one other gas from passing therethrough. The evacuator evacuates at least oxygen from within the storage chamber through the differentially permeable membrane disposed in the outlet fluid passage. Most preferably, the differentially permeable membrane allows at least oxygen to pass therethrough while inhibiting at least nitrogen from passing therethrough.

In both embodiments, the evacuator preferably comprises either a fan, a pump or a compressor. The differentially permeable membrane may take any of a number of forms, including a substantially flat sheet of material or cartridge, or a substantially cylindrical hollow fiber cartridge. Preferably, a gauge is provided for monitoring the level of oxygen within the storage chamber. Most preferably, the gauge is used to selectively switch the evacuator on or off depending upon the oxygen level within the storage chamber in order to conserve energy.

In another embodiment a storage device for the preservation of oxidizable materials includes a storage chamber enclosing a storage space where oxidizable materials may be placed and a differentially permeable membrane. The differentially permeable membrane allows at least one selected gas to pass therethrough while inhibiting at least oxygen from passing therethrough. The differentially permeable membrane is in fluid communication with the storage chamber such that the at least one selected gas is allowed to pass through the differentially permeable membrane flows into the storage chamber. An air mover, preferably a compressor, feeds gases to the differentially permeable membrane. The level of oxygen within the storage chamber is thus reduced relative to the level of oxygen in the atmosphere.

Preferably, the at least one selected gas allowed to pass through the differentially permeable membrane comprises nitrogen. It is also preferable that the differentially permeable membrane includes a vent for venting oxygen to the atmosphere. According to current technology, the differentially permeable membrane preferably comprises a substantially cylindrical cartridge having a plurality of hollow fibers disposed therein. If the differentially permeable membrane employed requires a positive pressure thereacross, a flow controller valve is preferably provided which, in conjunction with the air mover, maintains a positive pressure across the differentially permeable membrane. Most preferably, the flow controller valve comprises a needle valve. When a positive pressure across the differentially permeable membrane is provided, a gauge may be included to indicate the level of positive pressure maintained across the differentially permeable membrane.

The storage device may optionally include a moisture separator or filter to remove moisture from gases entering the differentially permeable membrane when certain membranes are used which require relatively low humidity to operate properly.

In one particular open system embodiment, the air mover draws the gases for feeding to the differentially permeable membrane from the atmosphere. When such is the case, the storage chamber preferably includes a vent to allow gases present therein, including oxygen introduced when the storage chamber is opened to access objects therein, to be forced out by substantially oxygen free gases passed through the differentially permeable membrane. Most preferably, the vent of the storage chamber comprises a seal around a door of the storage chamber which allows gases to escape therearound.

In another particular closed system embodiment, the air mover draws the gases for feeding to the differentially permeable membrane from within the storage chamber. When such is the case, the system preferably includes a vent to allow gases from the atmosphere to vent into the system to replace oxygen and any other gases which are not allowed to pass through the differentially permeable membrane so that a negative pressure situation in not created within the system. Most preferably the vent of the storage chamber comprises a valve which allows gases to enter therethrough. In this particular embodiment, it is also preferable that an organic volatile neutralizer be provided to neutralize and/or remove organic volatiles from gases entering the storage chamber.

Preferably the level of oxygen within the storage chamber is maintained in a range of about 2% to about 8%. Most preferably the level of oxygen within the storage chamber is maintained in a range of about 4% to about 6%. Preferably, the temperature within the storage chamber is cooled to a temperature about 15° F. to about 20° F. below normal room temperature.

In another aspect, the present invention relates to a method for storing and preserving oxidizable materials. In this method, a storage chamber enclosing a storage space where oxidizable materials may be placed is provided. At least one selected gas is forced to pass through a differentially permeable membrane and into the storage chamber while inhibiting at least oxygen from passing through the differentially permeable membrane. The level of oxygen within the storage chamber is maintained at a level which is reduced relative to the level of oxygen in the atmosphere. The temperature within the storage chamber is cooled to a level below the ambient temperature.

The method preferably further comprises the step of venting the oxygen inhibited from passing through the differentially permeable membrane to the atmosphere. Also, depending upon the differentially permeable membrane employed, it may be desirable to maintain a positive pressure across the differentially permeable membrane. Preferably, the at least one selected gas forced to pass through the differentially permeable membrane comprises nitrogen. Also preferably, the level of oxygen within the storage chamber is maintained in a range of about 2% to about 8%. Most preferably the level of oxygen within the storage chamber is maintained in a range of about 4% to about 6%. Preferably, the temperature within the storage chamber is cooled to a temperature about 15° F. to about 20° F. below normal room temperature.

In yet another aspect, the present invention relates to a refrigerator which includes a storage chamber enclosing a storage space where oxidizable materials may be placed and a differentially permeable membrane. The differentially permeable membrane allows at least one selected gas to pass therethrough while inhibiting at least oxygen from passing therethrough. The differentially permeable membrane is in fluid communication with the storage chamber such that the at least one selected gas is allowed to pass through the differentially permeable membrane flows into the storage chamber. An air mover, preferably a compressor, feeds gases to the differentially permeable membrane. The level of oxygen within the storage chamber is thus reduced relative to the level of oxygen in the atmosphere.

The invention and its particular features and advantages will become more apparent from the following detailed description considered with reference to the accompanying drawings.

DETAILED DESCRIPTION OF THE INVENTION

Figure 1:
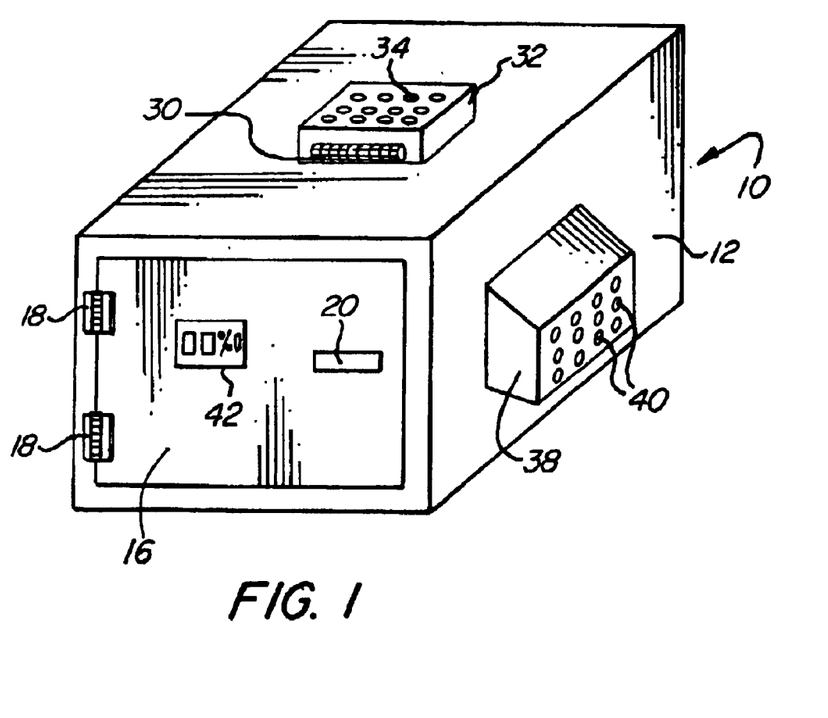
FIG. 1 is a perspective view of an embodiment of a storage device for oxidizable materials in accordance with the present invention.
Figure 2:
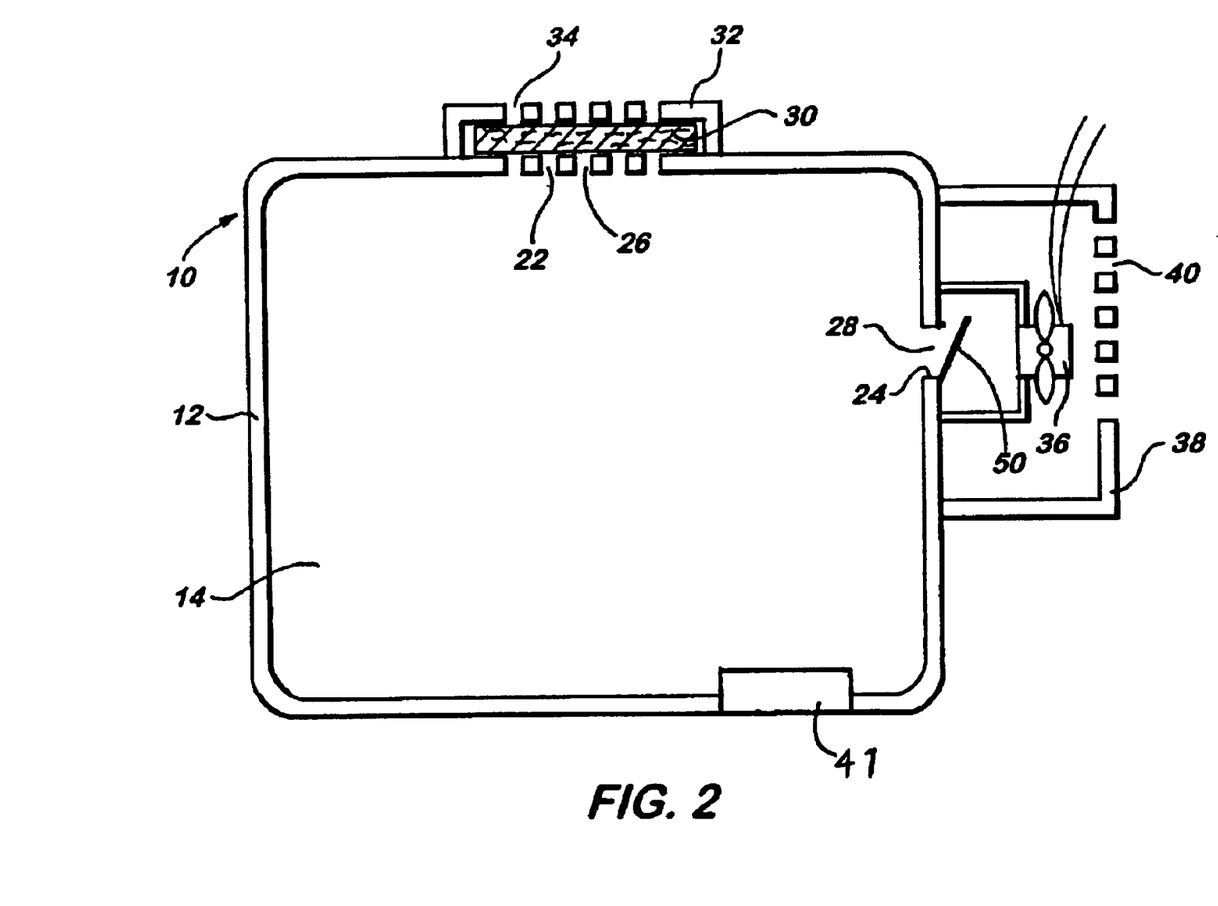
FIG. 2 is a cross-sectional view of the embodiment of a storage device for oxidizable materials shown in FIG. 1.
Figure 3:
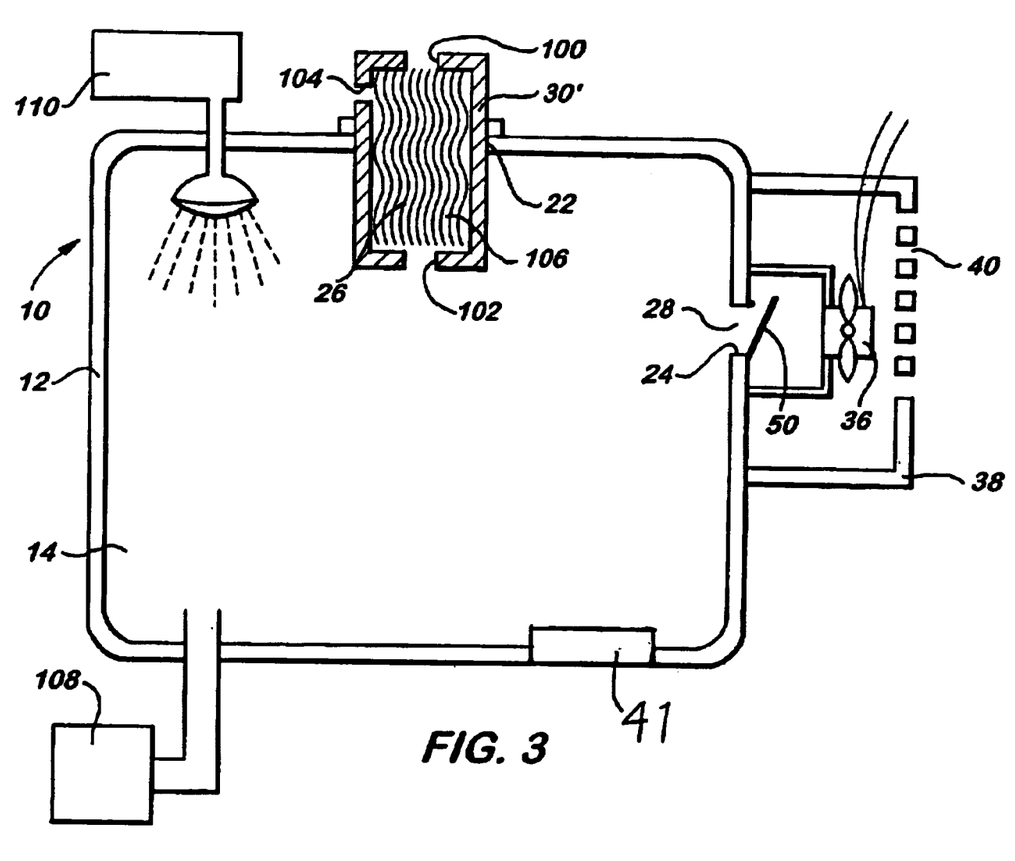
FIG. 3 is a cross-sectional view of a second embodiment of a storage device for oxidizable materials in accordance with the present invention.

Referring first to FIGS. 1 through 3, a storage device 10 for oxidizable materials is shown. Storage device 10 includes a plurality of outer walls 12 defining a storage chamber 14. Storage chamber 14 may be of substantially any shape, for example, square, rectangular, cylindrical, trapezoidal, cookie jar-shaped, thermos-shaped, etc., by varying the configuration of outer walls 12, as should be readily apparent to those skilled in the art. A rectangular shape, however, is preferred for ease of construction and use, as shown in the Figures. Storage chamber 14 provides a convenient place to store oxidizable objects.

Access to the interior of storage chamber 14 is provided through door 16 utilizing hinges 18 and a handle mechanism 20 which is known in the art. Any satisfactory door and handle means may be used to access the interior portion of storage chamber 14 while providing a reasonably air tight seal between the exterior and interior. As such, and because such door and handle means are known in the art, a detailed description thereof is not presented herein. However, it should be noted that it is preferable, although not necessary, that door 16 comprise substantially an entire side of storage chamber 14 and that hinges 18 are positioned accordingly, such as is the case with a typical microwave oven. This arrangement is preferable so as to allow unrestricted access to the interior of storage chamber 14, and to allow off-gases (which may occur particularly when fresh fruits or vegetables are stored) to exit storage chamber 14 through door 16 when opened.

An inlet opening 22 and an outlet opening 24 pass through outer walls 12 in order to create inlet fluid passage 26 and outlet fluid passage 28 respectively between storage chamber 14 and the atmosphere. Inlet opening 22 and outlet opening 24 may pass through the same outer wall 12, or through different outer walls 12 (as shown in the Figures). Moreover inlet opening 22 and outlet opening 24 may comprise a single opening (as shown in FIG. 2 with respect to outlet opening 24) or a plurality of openings (as shown in FIG. 2 with respect to inlet opening 22).

Disposed within inlet fluid passage 26 is a differentially permeable membrane 30. Differentially permeable membrane 30 is formed from a material which allows one or more selected gases to differentially pass therethrough, while inhibiting oxygen from doing the same. As the normal atmosphere contains almost 80% nitrogen (which does not typically deleteriously affect oxidizable materials), differentially permeable membrane 30 is preferably formed from a material which allows nitrogen to differentially pass therethrough, while inhibiting oxygen from doing the same.

However, it should also be noted that differentially permeable membrane 30 may be formed from a material which allows gases other than, or in addition to, nitrogen to differentially pass therethrough. For example, if carbon dioxide would not adversely affect the oxidizable materials to be stored within storage chamber 14, differentially permeable membrane 30 may be formed from a material which allows both nitrogen and carbon dioxide to pass therethrough, while inhibiting oxygen from doing the same.

It should also be noted that differentially permeable membrane 30 may take any of numerous forms. For example, FIGS. 1 and 2 show differentially permeable membrane 30 as taking the form of a substantially flat cartridge or sheet of material for the sake of simplicity. When such is the case, a membrane holder 32 may be provided which allows differentially permeable membrane 30 to be easily slid in or out, which facilitates replacement of differentially permeable membrane 30 should such be required. Membrane holder 32 includes at least one opening 34 therein for allowing air to enter therethrough to reach differentially permeable membrane 30. However, as will be understood by those skilled in the art, differentially permeable membranes having a substantially flat configuration are not currently widely employed.

Rather, and referring specifically now to FIG. 3, differentially permeable membrane 30', according to currently existing technology, preferably takes the form of a cylindrical cartridge or the like. Such a cartridge typically includes an inlet 100 for receiving gases to be differentially separated, an outlet 102 for passing through the selected gas or gases which are allowed to pass, and a vent 104 for returning the selected gas or gases which are not allowed to pass to the original volume of gases (whether it be the atmosphere or the storage chamber 14). Located within the cartridge are a plurality of hollow fibers 106 which act to separate and direct appropriate gases to either outlet 102 or vent 104. Because such cartridges are known to those skilled in the art, and readily available on the market (for example, from MEDAL L.P. of Newport, Del.), a more detailed description of such cartridges is not presented herein. As should be understood by those skilled in the art, other configurations for differentially permeable membrane 30 are also possible.

Disposed adjacent to outlet opening 24 within outlet fluid passage 28 is an evacuator 36, for drawing gases out of storage chamber 14. Evacuator 36 may take the form of, for example, a fan, a compressor or a pump. However, it should be understood that a relatively powerful compressor, such as is used in refrigeration cycle systems, is not required. It should also be understood that it is not necessary for there to be a strong vacuum maintained within storage chamber 14. All that is necessary is an evacuator 36 powerful enough to remove gases from storage chamber 14 and allow the selected gas or gases (e.g., nitrogen, carbon dioxide, etc.) to differentially pass through differentially permeable membrane 30. A housing 38 may be provided to house evacuator 36, which housing includes at least one opening 40 passing therethrough in order to allow gases evacuated from storage chamber 14 to be passed to the atmosphere.

A cooling element 41 is provided to lower the temperature within storage chamber 14 below the ambient temperature surrounding storage device 10. Cooling element may take the form, for example, of a traditional heating or cooling coil or of a piezoelectric or Peltier module, provided in or around storage chamber 14. Preferably, cooling element 41 cools storage chamber 14 to only a relatively small degree as compared to typical refrigeration systems. For example, it has been found that cooling the temperature within storage chamber 14 to a temperature about 15° F. to about 20° F. below normal room temperature provides desirable results in terms of extending storage life while not creating the above described typical problems associated with refrigeration devices which maintain the temperature well below room temperature. It is for this reason that piezoelectric or Peltier modules, which are not generally as effective as traditional refrigeration systems, are sufficient in the present situation. Moreover, as such modules are much less expensive to manufacture and operate than traditional refrigeration systems, they are highly desirable for use in storage device 10.

A gauge or oxygen meter 42 may optionally be provided to monitor the percentage of oxygen content within storage chamber 14. Although not required, such a gauge 42 may allow a user or manufacturer to verify that the oxygen content of storage chamber 14 is within a desired range. Moreover, gauge 42 may be used to selectively switch evacuator 36 on or off depending upon the oxygen content of storage chamber 14 in order to conserve energy. For example, when the oxygen content within storage chamber 14 is above a desired value, evacuator 36 may be turned on, and when the oxygen content within storage chamber 14 is below the desired value, evacuator 36 may be turned off. Alternately, evacuator 36 may continuously run.

A one-way check valve 50 may also be disposed within outlet fluid passage 28 in order to inhibit oxygen-containing air from entering storage chamber 14 therethrough. As should be understood by those skilled in the art, such a check valve 50 is particularly desirable when evacuator 36 is allowed to be turned off. However, a check valve 50 may be desirable in any event, such that in the case of a power failure or the like, the evacuator is unintentionally turned off.

In operation, storage device 10 operates by removing gases from storage chamber 14 through outlet fluid passage 28, while allowing a selected gas or gases present in the atmosphere (e.g., nitrogen, carbon dioxide, etc.) to be drawn into storage chamber 14 through differentially permeable membrane 30 located within inlet fluid passage 26. Thus, even if storage chamber 14 initially contains some oxygen, for example, as would be introduced when door 16 is opened to gain access to storage chamber 14, the content of oxygen within storage chamber 14 would be gradually decreased as the gases within storage chamber 14 (which include the oxygen) are evacuated, and replaced with substantially oxygen free gases.

By employing the above-described storage device, the atmosphere within storage chamber 14 may be controlled to replace normal atmospheric content of gas (i.e., approximately 80% nitrogen and 20% oxygen) with an atmosphere with considerably less oxygen. It has been found that that providing an atmosphere within storage chamber 14 wherein the content of oxygen is between 2% and 8% is desirable. This is true because, as will be understood by those skilled in the art, there are generally three processes of deterioration which adversely affect stored materials: (i) oxidation, (ii) enzymatic deterioration, and (iii) microbial contamination. With respect to the first two of these processes, it is generally desirable to maintain as low an oxygen content as possible (i.e., the closer the oxygen content to 0% the better). However, with respect to microbial contamination, some types of bacteria (i.e., anaerobic bacteria) are known to flourish in substantially oxygen-free environments. Thus, maintaining an oxygen content of less than approximately 2% may be undesirable. It has also been found that the above-referenced deterioration processes are slowed or halted only in environments having oxygen contents of approximately 8% or less. Thus, the preferred range for oxygen content within storage chamber 14 is from about 2% to about 8%. As will also be recognized by those skilled in the art, the ideal oxygen content may vary depending upon the objects expected to be stored therein. However, it is often the case that various objects will be stored together, each of which has its own ideal oxygen content associated therewith. For example, when various fruits, vegetables and other food materials are being stored together, an oxygen content in the most preferred range of from about 4% to about 6% provides acceptable results.

Because storage device 10 preferably incorporates a fan, pump or simple compressor instead of a vacuum pump or refrigeration compressor, the device is more energy efficient than known refrigeration and vacuum systems.

Referring again to FIG. 3, storage device 10 may further include additional optional elements to further enhance the storage capabilities thereof. For example, if storage device is to be used to store certain items, such as certain foods which benefit from moisture, a humidifier 108 may be provided to provide moisture to the gases within storage chamber 14. Further, a device 110 for killing undesirable microbes, such as an ultraviolet light or an anti-microbial spray, may also be provided.

Figure 4:
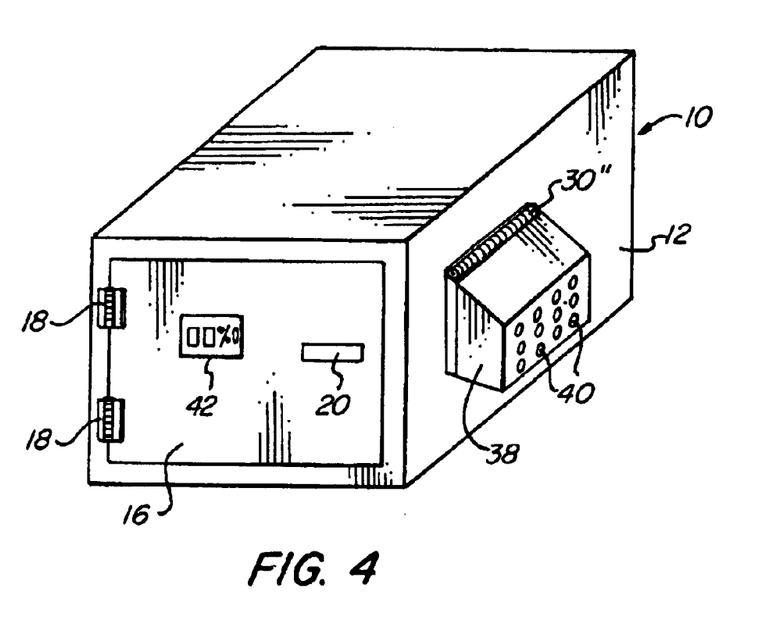
FIG. 4 is a perspective view of a third embodiment of a storage device for oxidizable materials in accordance with the present invention.
Figure 5:
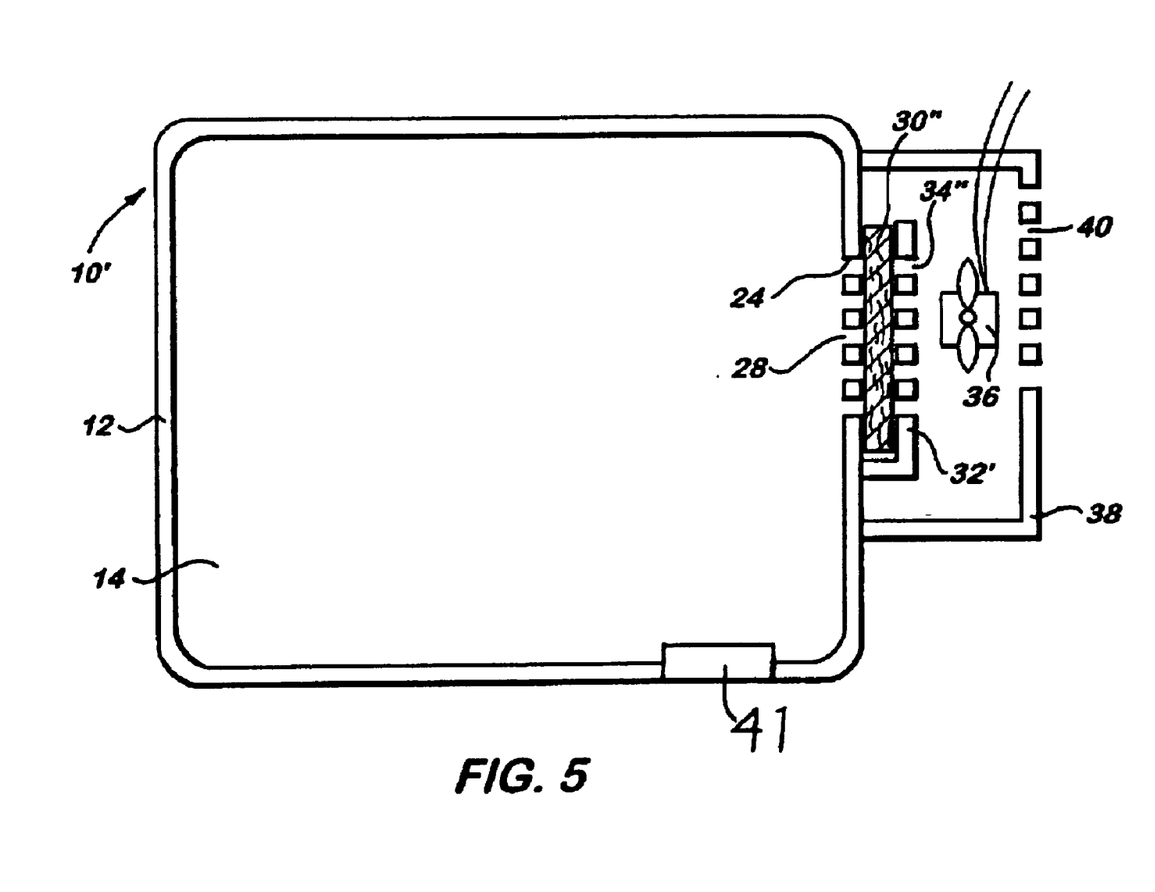
FIG. 5 is a cross-sectional view of the embodiment of a storage device for oxidizable materials shown in FIG. 4.

Referring now to FIGS. 4 and 5, another embodiment of a storage device 10' in accordance with the present invention is shown. This embodiment is similar to the embodiments discussed above, with the main exception being that a differentially permeable membrane 30" which allows at least oxygen to differentially pass therethrough, while inhibiting at least one gas (preferably at least nitrogen) from doing the same. In this embodiment, no inlet passage is provided, and differentially permeable membrane 30" is disposed within outlet fluid passage 28. As with the embodiments discussed above, differentially permeable membrane 30" may take numerous forms, such as a substantially flat cartridge or sheet of material, or a cylindrical cartridge. A membrane holder 32' may be provided which allows differentially permeable membrane 30" to be easily slid in or out, which facilitates replacement of differentially permeable membrane 30" should such be required. Membrane holder 32' includes at least one opening 34' therein for allowing oxygen (and any other gases) passing through differentially permeable membrane 30" to reach the atmosphere.

In operation, this embodiment of storage device 10 operates by removing oxygen from storage chamber 14 through outlet fluid passage 28, while inhibiting a selected gas or gases initially present within storage chamber 14 (e.g., nitrogen) to be withdrawn through differentially permeable membrane 30" located within outlet fluid passage 28. Thus, even if storage chamber 14 initially contains some oxygen, for example, as would be introduced when door 16 is opened to gain access to storage chamber 14, the content of oxygen within storage chamber 14 would be gradually decreased as it is evacuated through differentially permeable membrane 30".

Figure 6:
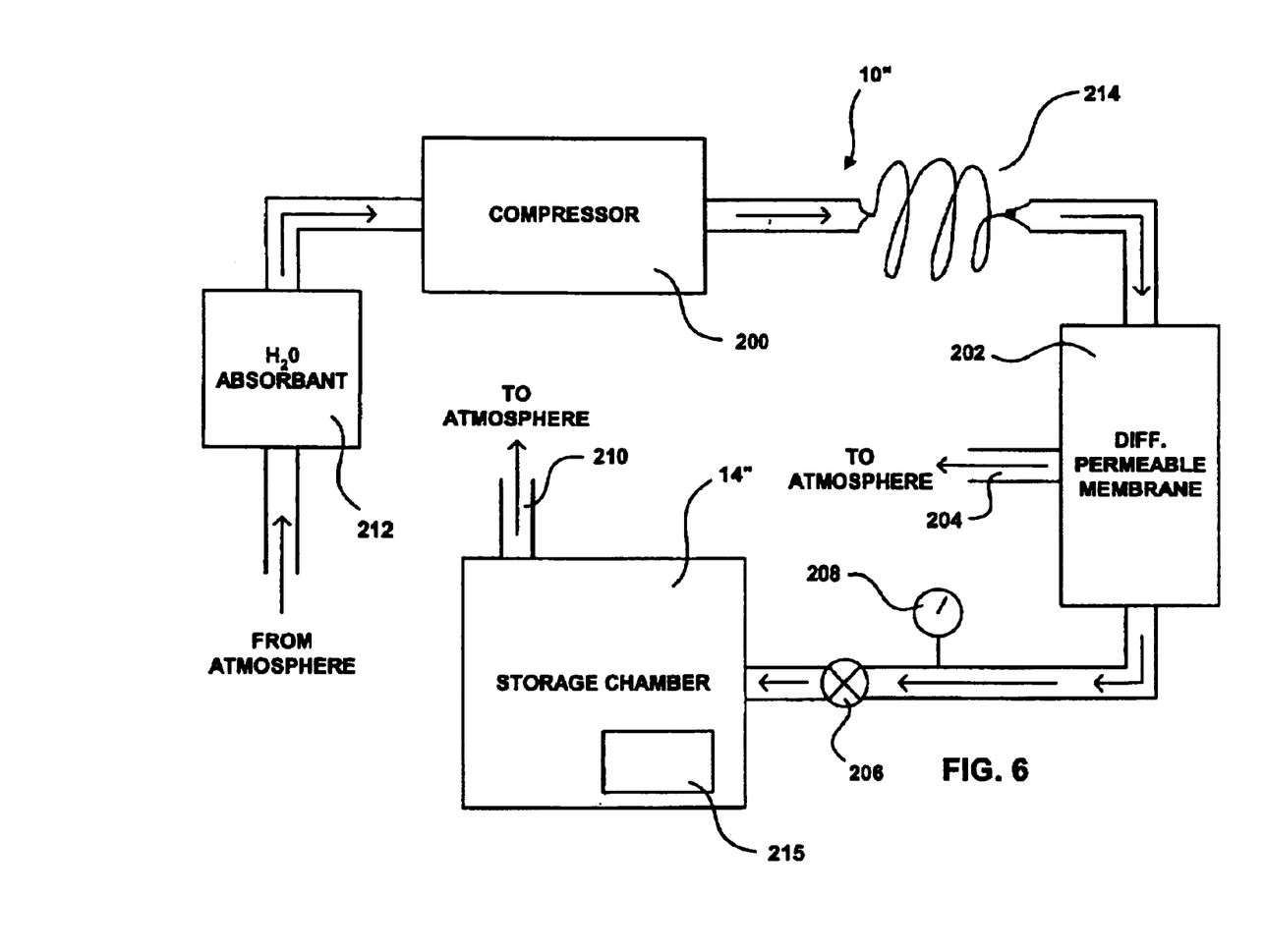
FIG. 6 is a schematic view of an open system embodiment of a storage device for oxidizable materials in accordance with the present invention.

Referring now to FIG. 6, an open system embodiment of a storage device 10" for oxidizable materials in accordance with the present invention is schematically shown. Storage device 10" includes a storage chamber 14". An air mover 200 is provided to draw air from the atmosphere and feed it to a differentially permeable membrane 202. Air mover 200 preferably comprises a compressor, but may also comprise a fan, a pump, a blower or any other device for feeding various gases. Differentially permeable membrane 202 may take many forms, but according to currently existing technology, preferably takes the form of a cylindrical cartridge or the like as described above in more detail with reference to FIG. 3. Such a cartridge typically includes an inlet for receiving gases from air mover 200, an outlet for passing through the selected gas or gases which are allowed to pass (e.g. nitrogen) to storage chamber 14", and a vent 204 for returning the selected gas or gases which are not allowed to pass (e.g. oxygen) back to the atmosphere. In some cases, differentially permeable membrane 202 may require that a positive pressure be maintained thereacross in order to function properly. In such cases, a flow controller valve 206, such as a needle valve, may be provided downstream of differentially permeable membrane 202 to maintain, in conjunction with air mover 200, the proper positive pressure. A gauge 208 or the like may be provided to ensure that the proper positive pressure required by the specific differentially permeable membrane 202 being used is being maintained. Storage chamber 14" includes a vent 210 or the like to allow gases present therein, including oxygen which may be introduced when storage chamber 14" is opened to access objects therein, to be forced out by the substantially oxygen free gases passed through differentially permeable membrane 202. In one preferred embodiment, vent 210 may simply comprise a seal around a door of storage chamber 14" which allows gases to escape therearound.

In addition, a cooling element is provided to lower the temperature of the gases in the system and within storage chamber 14". The cooling element may take the form, for example of a traditional heating or cooling coil 214. The heating or cooling element may optionally take the form of a piezoelectric or Peltier module 215, provided in or around storage chamber 14". Although such cooling elements are not generally as effective as traditional refrigeration systems, they are desirable for use with the present invention since, as described above, only a small temperature decrease is necessary, and since they are much less expensive to manufacture and operate.

Storage device 10" may include various additional air treatment devices when desirable depending upon the objects to be stored. For example, a moisture separator or filter, such as a water absorbent 212, may be provided to remove moisture from gases entering the differentially permeable membrane when certain membranes are used which require relatively low humidity to operate properly. A humidifier (not shown) may also be provided to provide moisture to the gases within storage chamber 14".

Figure 7:
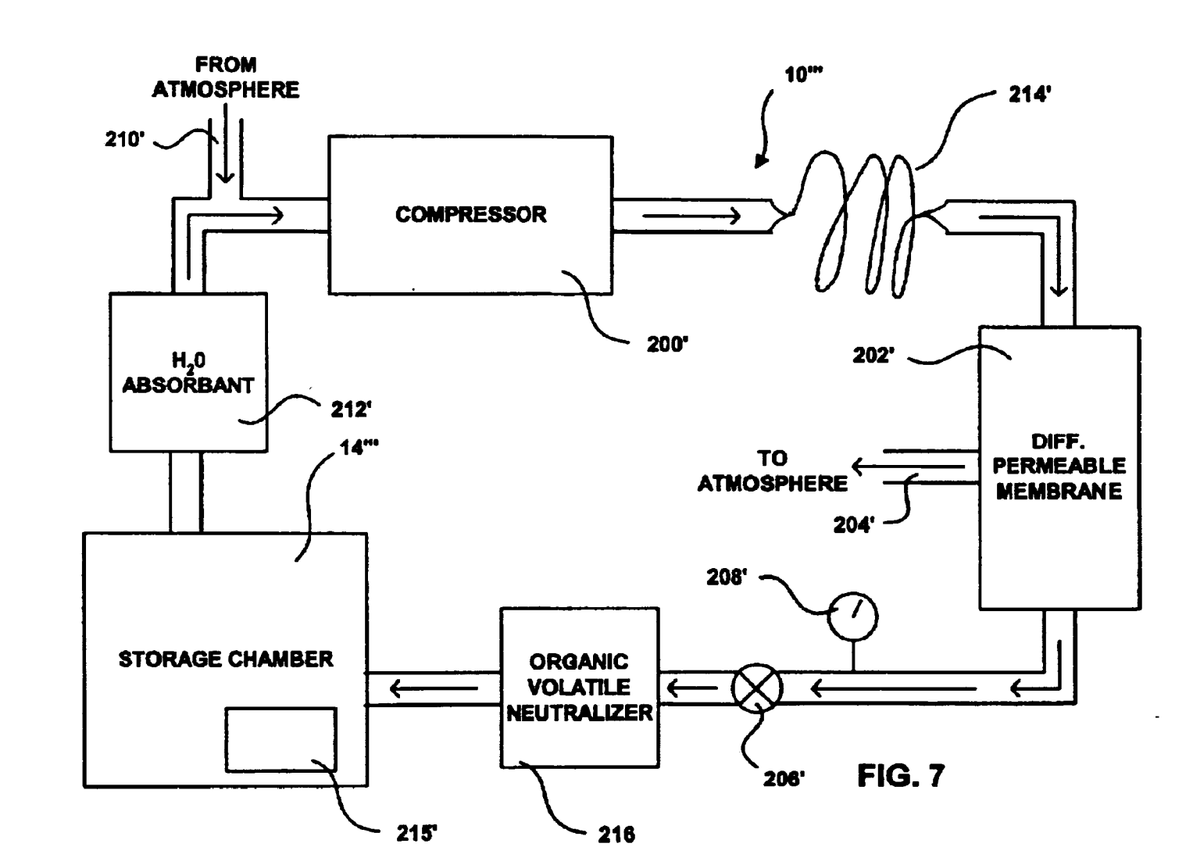
FIG. 7 is a schematic view of a closed system embodiment of a storage device for oxidizable materials in accordance with the present invention.

Referring now to FIG. 7, a closed system embodiment of a storage device 10'" for oxidizable materials in accordance with the present invention is schematically shown. Storage device 10'" includes many of the same elements as storage device 10" described above with respect to FIG. 6, and like reference numerals are used to designate like components. The main distinction of the closed system shown in FIG. 7 is that rather than air mover 200 drawing air from the atmosphere, air mover 200' draws gases from storage chamber 14'". Since such is the case, vent 210', unlike vent 210 which vents gases from within storage chamber 14", vents gases from the atmosphere into system to replace oxygen and any other gases which are not allowed to pass through differentially permeable membrane 202' and which are returned back to the atmosphere so that a negative pressure situation in not created within storage chamber 14'". Vent 210' may comprise a valve, for example a t-valve, placed somewhere in the system, such as upstream of air mover 200' as shown in FIG. 7. Also, air mover 200' draws gases from storage chamber 14'", which gases may contain organic volatiles released by the objects stored within storage chamber 14'", an organic volatile neutralizer 216, such as activated charcoal and/or potassium permanganate, may be provided to neutralize and/or remove such organic volatiles.

The open system shown in FIG. 6 operates by forcing gases from storage chamber 14" through vent 210 and replacing such gases with substantially oxygen free gases which pass through the system. Thus, even if storage chamber 14" initially contains some oxygen, for example, as would be introduced when the door thereof is opened to gain access to storage chamber 14', the content of oxygen within storage chamber 14' would be gradually decreased as the gases within storage chamber 14' (which include the oxygen) are forced out, and replaced with substantially oxygen free gases. The closed system shown in FIG. 7 operates in a slightly different way by causing gases within the closed system to be continually recirculated through differentially permeable membrane 202' such that oxygen introduced into the closed system through vent 210' and/or when the door of chamber 14''' is opened to gain access thereto is separated and removed from the system by differentially permeable membrane 202'. Thus, the level of oxygen within chamber 14''' is gradually decreased as the gasses present with the system continue to recirculate.

Figure 8:
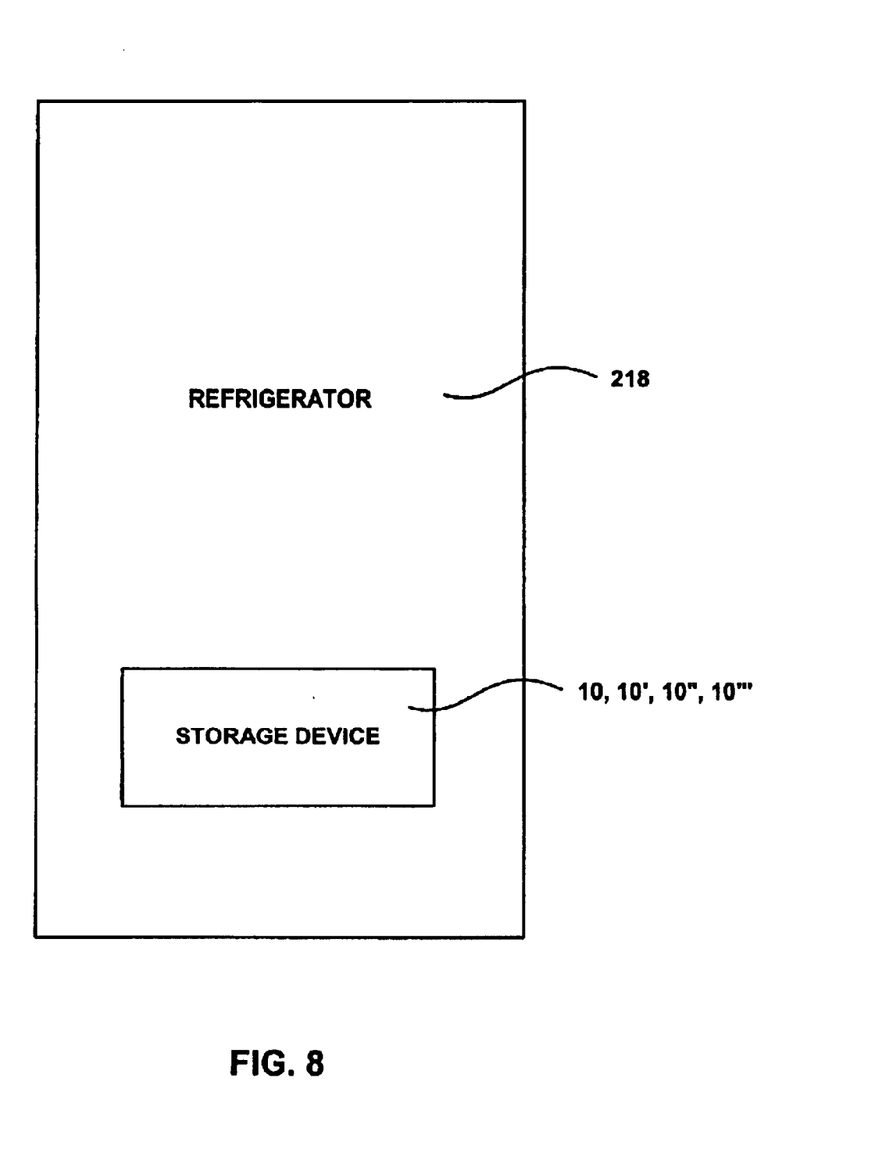
FIG. 8 is a schematic view of a refrigerator including a storage device for oxidizable materials in accordance with the present invention.

It should be understood that a storage device 10, 10', 10'', 10''' in accordance with the present invention may comprise a stand-alone device. If desired, such a storage device may be portable, and may be powered by a self-sustained power supply, such as by batteries, rechargeable or conventional. It should also be understood that, as schematically illustrated in FIG. 8, storage device 10, 10', 10'', 10''' may be incorporated into a larger device, such as a refrigerator 218. In such a case, storage device 10, 10', 10'', 10''' may be used instead of or in addition to various fruit/vegetable and/or crisper drawers as are conventional in known refrigerator designs.

The present invention, therefore, provides a storage device for oxidizable materials which controls the gaseous content of a storage volume of the device in order to prolong storage life, to allow storage of currently difficult-to-store materials, to allow storage of non-refrigeratable foods and to inhibit the ripening and/or deterioration of certain foods without adversely affecting flavor, which is relatively simple in design, lightweight and inexpensive to produce, which operates quietly and does not generate a great amount of heat, which is appropriate for storing certain oxidizable food items and non-food items, which is energy efficient and therefore relatively inexpensive to operate and environmentally friendly, which does not risk implosion, and which does not require servicing and/or the replacement of components on a regular basis.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A storage device for the preservation of oxidizable materials comprising:
    a storage chamber enclosing a storage space where oxidizable materials may be placed;
    a differentially permeable membrane, said differentially permeable membrane allowing at least one selected gas to pass therethrough while inhibiting at least oxygen from passing therethrough, said differentially permeable membrane in fluid communication with said storage chamber such that the at least one selected gas allowed to pass through said differentially permeable membrane flows into said storage chamber;
    an air mover for feeding gases to said differentially permeable membrane;
    a piezoelectric or Peltier module for cooling the temperature within said storage chamber below that of the ambient temperature surrounding said storage device; and
    wherein the level of oxygen within said storage chamber is reduced relative to the level of oxygen in the atmosphere and is maintained in a range of about 4% to about 6%.

2. The storage device of claim 1 wherein the at least one selected gas allowed to pass through said differentially permeable membrane comprises nitrogen.

3. The storage device of claim 1 whereIn said differentially permeable membrane comprises a vent for venting oxygen to the atmosphere.

4. The storage device of claim 3 wherein said differentially permeable membrane comprises a substantially cylindrical cartridge having a plurality of hollow fibers disposed therein.

5. The storage device of claim 1 further comprising a flow controller valve which, in conjunction with said air mover, maintains a positive pressure across said differentially permeable membrane.

6. The storage device of claim 5 wherein said flow controller valve comprises a needle valve.

7. The storage device of claim 5 further comprising a gauge to indicate a level of positive pressure across said differentially permeable membrane.

8. The storage device of claim 1 further comprising a moisture separator or filter to remove moisture from gases entering said differentially permeable membrane.

9. The storage device of claim 1 wherein said cooling element cools the temperature within said storage chamber to a temperature within a range from about 15° F. to about 20° F. below normal room temperature.

10. The storage device of claim 1 wherein said air mover draws the gases for feeding to said differentially permeable membrane from the atmosphere.

11. The storage device of claim 10 wherein said storage chamber includes a vent to allow gases present therein, including oxygen introduced when said storage chamber is opened to access objects therein, to be forced out by substantially oxygen free gases passed through said differentially permeable membrane.

12. The storage evice of claim 11 wherein the vent of said storage chamber comprises a seal around a door of said storage chamber which allows gases to escape therearound.

13. The storage device of claim 1 wherein said air mover draws the gases for feeding to said differentially permeable membrane from within said storage chamber.

14. The storage device of claim 13 further comprising a vent to allow gases from the atmosphere to vent into said storage device to replace oxygen and any other gases which are not allowed to pass through said differentially permeable membrane so that a negative pressure situation in not created within said storage device.

15. The storage device of claim 14 wherein said vent comprises a valve which allows gases to enter therethrough.

16. The storage device of claim 13 further comprising an organic volatile neutralizer to neutralize and/or remove organic volatiles from gases within said storage chamber.

17. The storage device of claim 1 wherein said air mover comprises a compressor.

18. A method for storing and preserving oxidizable materials, said method comprising the steps of:
    providing a storage chamber enclosing a storage space where oxidizable materials may be placed;
    forcing at least one selected gas to pass through a differentially permeable membrane and into the storage chamber while inhibiting at least oxygen from passing through the differentially permeable membrane;
    providing a piezoelectric or Peltier module for cooling the temperature within the storage chamber below that of the ambient temperature surrounding the storage chamber; and
    maintaining the level of oxygen within the storage chamber at a level which is reduced relative to the level of oxygen in the atmosphere and is within a range of from about 4% to about 6%.

19. The method of claim 18 further comprising the step of venting the oxygen inhibited from passing through the differentially permeable membrane to the atmosphere.

20. The method of claim 18 further comprising the step of maintaining a positive pressure across the differentially permeable membrane.

21. The method of claim 18 wherein the at least one selected gas forced to pass through the differentially permeable membrane comprises nitrogen.

22. The method of claim 21 wherein said cooling step comprises that step of cooling the temperature within the storage chamber to a temperature within a range from about 15° F. to about 20° F. below normal room temperature.

23. A refrigerator which includes a storage chamber enclosing a storage space where oxidizable materials may be placed, said refrigerator comprising:

a differentially permeable membrane, said differentially permeable membrane allowing at least one selected gas to pass therethrough while inhibiting at least oxygen from passing therethrough, said differentially permeable membrane in fluid communication with said storage chamber such that the at least one selected gas allowed to pass through said differentially permeable membrane flows into said storage chamber;

an air mover for feeding gases to said differentially permeable membrane;

piezoelectric or Peltier module for cooling the temperature within said storage chamber below that of the ambient temperature surrounding said storage chamber; and wherein the level of oxygen within said storage chamber is reduced relative to the level of oxygen in the atmosphere and is maintained in a range of about 4% to about 6%.

24. The refrigerator of claim 23 wherein said air mover comprises a compressor.

* * * * *